United States Patent Office 3,528,904
Patented Sept. 15, 1970

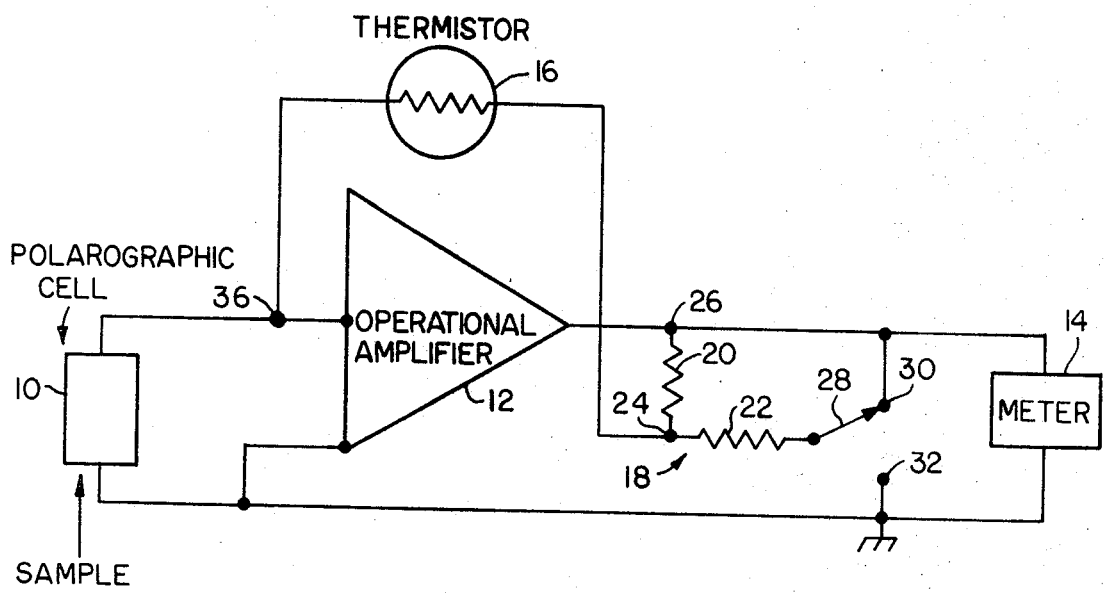

3,528,904
RANGE SCALE CIRCUIT INCLUDING TEMPERATURE COMPENSATION ELEMENT
Arnie L. Cliffgard, Fountain Valley, Calif., assignor to Beckman Instruments, Inc., a corporation of California
Filed Apr. 12, 1968, Ser. No. 721,030
Int. Cl. G01n 27/46
U.S. Cl. 204—195        3 Claims

ABSTRACT OF THE DISCLOSURE

A range scale circuit for a portable gas analyzer system including an element for temperature compensation is disclosed. The system comprises a sensing polarographic cell connected to an operational amplifier which is connected to an indicating meter. The feedback loop of the operational amplifier comprises a temperature compensating element followed by a range selector circuit which includes two resistors arranged such that regardless of the position of the range selection switch, the impedance to which the temperature compensation is connected remains the same.

---

The present invention relates to a range scale circuit and more particularly to a range scale circuit including a temperature compensating element.

Portable gas analyzer systems generally utilize a polarographic cell as a constituent gas detection means which may comprise an anode and a cathode separated from the constituent to be detected by a selectively permeable membrane. The gas constituent to be detected, usually oxygen, diffuses through the membrane at a known rate at a given temperature. The gas causes electrochemical reaction in the cell whereby an electrical signal is developed that is a function of the rate of diffusion through the membrane and thereby of the partial pressure of the gas in the sample. However, when there is a change of temperature, the permeability of the membrane changes, generally being more permeable at higher temperatures, such that a greater signal is developed even though the constituent partial pressure has not changed. Hence, some sort of compensation must be provided to reduce errors caused by temperature variations.

In portable gas analyzer systems it is desirable to provide a power supply utilizing a battery which necessitates an electrical system having low power consumption.

Further, in order to make such a system versatile it is desirable to provide, in the case of oxygen, a first scale reading from zero to more than the 21% of oxygen normally found in air and, at least, a second scale having a much smaller range, such as 0 to 5% oxygen for measuring oxygen levels in systems having relatively low oxygen contents. Multiple ranges are also desired in the detection of other gases although the percentage ranges may not be the same as that for oxygen.

An object of the present invention is to provide a range scale circuit suitable for use in portable gas analyzers and including a temperature compensation element which allows range scale switching, has a low power consumption and which does not require adjustment when the range scale is changed.

Another object of the present invention is to provide an electrical circuit for measuring the output of a polarographic cell which is reliable, easily manufactured and suitable for use in portable systems.

Other objects, advantages and features of the present invention will become better understood by reference to the following description when considered in connection with the accompanying drawing wherein:

The single figure is a schematic diagram of a multirange measuring circuit constructed in accordance with this invention.

Referring now to the drawing there is illustrated a measuring circuit suitable for use in portable gas analyzers having the foregoing desirable characteristics. The circuit includes a polarographic cell generally indicated at 10 which produces an output current as a function of the diffusion rate of the constituent gas to be detected through the membrane and hence the partial pressure of the constituent in the sample. The output of cell 10 is connected across the input of the operational amplifier 12 having a meter 14 connected across its output terminals.

A temperature compensating element, such as thermistor 16, is connected in the feedback loop of the amplifier and is chosen so as to compensate for the change in diffusion rate of the constituent gas through the membrane of cell 10 as a function of temperature. While the temperature compensating element is illustrated herein as a single thermistor it is to be understood that it may include other impedances arranged to provide proper compensation. Also connected in the feedback loop is a range selection circuit 18 including resistors 20 and 22 connected at one end to form a junction 24 which is connected to temperature compensating element 16. Resistor 20 has its other end connected to the output terminal 26 of amplifier 12 and resistor 22 has its other end connected to the armature 28 of a range selection switch. In the position illustrated in the drawing armature 28 engages contact 30 connected to the output terminal 26. In its second position armature 28 engages contact 32 connected to the amplifier common terminal or circuit ground. In the first position of armature 28, that illustrated in the drawing, resistors 20 and 22 are connected in parallel in the feedback loop of the amplifier 12. In the second position of armature 28, resistors 20 and 22 are connected as a potential divider across the output of the amplifier 12 and resistor 20 is connected in series with the temperature compensating element 16 in the feedback path. The circuit is arranged such that by movement of armature 28 the range of meter 14 is changed while maintaining the total impedance connected to the input terminal 36 of the amplifier constant, thus no change in the load on the polarographic cell is present upon changing meter ranges. Further, as will be shown hereinafter, the compensation provided by the temperature compensating element is the same in both meter ranges.

As is well known an operational amplifier is a high gain, D.C. amplifier having very high input impedance and low output impedance. When connected with parallel feedback, as is the case in the preferred embodiment, the circuit operates to hold the input terminal 36 of the amplifier at virtual ground while drawing negligible current from the input source. Thus, essentially the entire output current from the input source flows through the feedback path.

Let it be assumed that the value of resistor 20 ($R_{20}$) is four times that of resistor 22 ($R_{22}$), i.e.:

$$R_{20} = R_{22} \tag{1}$$

When the range selection switch is in the position shown in the drawing, and since the amplifier draws negligible current from the input source and the input terminal is held at virtual ground, the entire current output of the cell ($i_c$) flows through the feedback path and the output of the amplifier is given by the equation:

$$e_o = i_c \left[ R_T + \frac{R_{20} R_{22}}{R_{20} + R_{22}} \right] \tag{2}$$

where $R_T$ is the impedance of the temperature compensating element 16. Substituting Equation 1 in Equation 2 and simplifying:

$$e_o = i_c \left[ R_T + \frac{4}{5} R_{22} \right] \tag{3}$$

If now armature 28 is switched to contact 32 the output of the operational amplifier is given by the general equation:

$$e_o = i_c \left[ \frac{R_T(R_{20}+R_{22}) + R_{20}R_{22}}{R_{22}} \right] \quad (4)$$

Substituting Equation 1 in Equation 4 and simplifying:

$$\frac{e_o}{5} = i_c \left[ R_T + \frac{4}{5} R_{22} \right] \quad (5)$$

Comparing Equations 2 and 5 it is apparent that for the values of $R_{20}$ and $R_{22}$ of Equation 1 the full scale range of meter 14 is changed by a factor of 5. For example, by appropriate selection of the component values the meter 14 may be calibrated to read from 0 to 25% oxygen level with the range selector switch in the position illustrated, i.e. engaging contact 30, while in the other position, engaging contact 32, from 0 to 5%, a scale ratio of 5 to 1 since for a given output current, the output of the amplifier is five times greater in the second case as in the first.

If now the ratio of Equations 3 and 5 is taken it will be seen that the ratio is in no way dependent upon the resistance of the temperature compensating network $R_T$. Thus, if the valve of $R_T$ as a function of temperature is appropriately selected to provide correct compensation in one range, that compensation is not affected by the change in ranges.

A further advantage of the circuit illustrated is that the load on the input source, i.e. the polarographic cell, is not changed as the range scale is changed. It may be shown by conventional circuit analysis that the load impedance connected to the input source in both conditions of the range selection switch is $$R_T = \frac{R_{20}R_{22}}{R_{20}+R_{22}} \quad (6)$$

Further the impedance to which the temperature compensating element is connected is:

$$\frac{R_{20}R_{22}}{R_{20}+R_{22}} \quad (7)$$

for both positions of the range selection switch.

In portable gas analyzers of the type utilizing a polarographic cell requiring a polarizing voltage, batteries are utilized as the power source. The foregoing circuit provides a minimum of power consumption and no increased power drain when the range selection switch is changed, yet provides a highly accurate, reliable and inexpensive circuit for such a system.

While the invention has been described in certain respects in connection with polarographic cells arranged to detect oxygen, it is to be understood that other constituents may be detected depending upon the polarizing voltage applied or developed across the cell electrodes. Further, while polarographic cells requiring a polarizing voltage have been mentioned, it is to be understood that certain polarographic cells are constructed to be self-energizing. The invention described herein is equally suited to such cells. It will further be obvious that while the 4 to 1 ratio of resistances 20 and 22 have been mentioned in connection with the 5 to 1 scale ratio, other resistance ratios may be selected to provide any desired scale ratio.

It is to be understood that while the invention has been described in connection with the preferred embodiment illustrated other embodiments are contemplated and will be apparent to those skilled in the art and the scope of the invention is not limited to the embodiment illustrated but is defined by the appended claims.

What is claimed is:
1. In a portable gas analyzer for measuring the quantity of a gas constituent, the improvement comprising:
   an operational amplifier having an input and an output;
   a temperature compensating means;
   at least a pair of impedances;
   switch means having at least first and second conditions;
   circuit means connecting, in said first condition of said switching means, said impedances in parallel and in series with said temperature compensating means in a parallel feedback circuit across said amplifier, and, in said second condition of said switch means, said impedances across the output of said amplifier and one of said impedances and said temperature compensating means in a parallel feedback circuit across said amplifier.

2. A portable gas analyzer for measuring the quantity of a gas constituent comprising:
   an operational amplifier having an input terminal, an output terminal and a common terminal;
   a polarographic cell having an electrical output signal that is a function of the partial pressure of a gas constituent connected to said input terminal;
   temperature compensating means;
   at least a pair of impedance means;
   switch means having first and second conditions;
   circuit means connecting, in said first condition of said switch means, said pair of impedances in parallel and in series with said temperature compensating means between said output and input terminals and, in said second condition of said switch means, said pair of impedances in series between said output and said common terminals and one of said impedances and said temperature compensating means in series between said output and input terminals; and
   indicating means connected between said output and common terminals.

3. The portable gas analyzer according to claim 2 wherein:
   said pair of impedances are connected at one end to form a junction; the other end of one of said impedances being connected to said output terminal and the other end of the other of said impedances connected to the armature of a switch having first and second contacts, one of said contacts being connected to said output terminal and the other of said contacts being connected to said common terminal; said temperature compensating element being connected between said input terminal and the junction of said pair of impedances.

References Cited

UNITED STATES PATENTS

| 3,106,676 | 10/1963 | Slater et al. | 324—115 |
| 3,297,943 | 1/1967 | Morgan et al. | 204—195 |
| 3,322,662 | 5/1967 | Mackereth | 204—195 |
| 3,432,418 | 3/1969 | Kleiss | 204—195 |

TA-HSUNG TUNG, Primary Examiner

U.S. Cl. X.R.

324—115

PO-1050
(5/69)

UNITED STATES PATENT OFFICE
CERTIFICATE OF CORRECTION

Patent No. 3,528,904      Dated September 15, 1970

Inventor(s) Arnie L. Cliffgard

It is certified that error appears in the above-identified patent and that said Letters Patent are hereby corrected as shown below:

Column 2, Equation 1, should read -- $R_{20} = 4R_{22}$ --;
Column 3, Equation 6, delete " = " and insert -- + --;
Column 4, line 13, change "switching" to --switch--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents